(12) United States Patent
Smith

(10) Patent No.: US 9,944,147 B1
(45) Date of Patent: Apr. 17, 2018

(54) COMBINATION SHOCK AND SMALL DEFLECTION MITIGATOR WITH TIRE WALL CONTROL IN CORNERING

(71) Applicant: S. Gregory Smith, Wilmington, DE (US)

(72) Inventor: S. Gregory Smith, Wilmington, DE (US)

( * ) Notice: Subject to any disclaimer, the term of this patent is extended or adjusted under 35 U.S.C. 154(b) by 0 days.

(21) Appl. No.: 14/597,204

(22) Filed: Jan. 14, 2015

(51) Int. Cl.
| B60G 17/08 | (2006.01) |
| B60G 17/019 | (2006.01) |
| B60G 17/015 | (2006.01) |
| F16F 9/32 | (2006.01) |
| F16F 9/50 | (2006.01) |

(52) U.S. Cl.
CPC ......... B60G 17/08 (2013.01); B60G 17/0155 (2013.01); B60G 17/01908 (2013.01); F16F 9/3292 (2013.01); F16F 9/50 (2013.01)

(58) Field of Classification Search
CPC ......... F16F 13/08; F16F 2230/08; F16F 9/20; F16F 9/325; F16F 9/3264; F16F 9/466; F16F 9/53; F16F 9/532; F16F 9/3292; F16F 9/50; F16F 9/19; F16F 9/468; F16F 9/461; F16F 9/064; F16F 9/066; F16F 9/145; F16F 9/26; F16F 9/48; F16F 9/49; F16F 9/58; B60G 17/0155; B60G 17/015; B60G 17/08; B60G 13/08; B60G 15/07; B60G 2202/24; B60G 2500/10; Y10T 137/7935

USPC ........... 701/37; 280/5.511, 93.51; 188/322.2, 188/299.1, 313
See application file for complete search history.

(56) References Cited

U.S. PATENT DOCUMENTS

| 5,437,354 | A | * | 8/1995 | Smith | B60G 17/005 |
| | | | | | 188/266.1 |
| 6,321,888 | B1 | * | 11/2001 | Reybrouck | F16F 9/325 |
| | | | | | 188/299.1 |
| 2005/0178626 | A1 | * | 8/2005 | Turner | B60G 17/002 |
| | | | | | 188/322.2 |
| 2007/0263489 | A1 | * | 11/2007 | Vaage | G01V 1/137 |
| | | | | | 367/144 |
| 2011/0315494 | A1 | * | 12/2011 | Marking | F16F 9/46 |
| | | | | | 188/281 |

* cited by examiner

*Primary Examiner* — Nga X Nguyen
(74) *Attorney, Agent, or Firm* — Andrew L. Salvatore, Esquire

(57) ABSTRACT

An improved shock absorber which is capable of absorbing higher pressures created by larger deflections in the roadway and absorbing lower pressures created by smaller deflections in the roadway. The second mechanism involves the use of a first and second chamber which may expand to absorb the force of roadway defections. Additional components such as a valve, pump, tilt control unit and CPU may be used to regulate the operation of the chambers. The mechanism for absorbing lower pressures and smaller deflections may be turned on or off depending on the desires of the user. In particular, where low profile tires are used, the user may desire a stiffer suspension, and a stiffer shock absorber in a curve. In such case, it may be desirable to turn off the portion designed to absorb smaller deflections so that the car will not "roll" when going around a curve.

1 Claim, 4 Drawing Sheets

COMBINATION SHOCK AND SMALL DEFLECTION MITIGATOR WITH TIRE WALL CONTROL IN CORNERING

BACKGROUND OF THE INVENTION

Suspension systems in vehicles comprise a number of components. Such components include vehicle tires, which deform to absorb bumps and return to previous size; springs, which cushion impact; shock absorbers located between the axle or frame or struts as part of the axle assembly to dampen the effect of impact; and bushings which are placed between the junctions of the above components.

The suspension system in a vehicle provides a variety of functions. Such functions include providing a softer ride for vehicle occupants while traveling over bumps. Additionally, a suspension system must provide stiffness to support a vehicle during travel and provide stability to a vehicle during turns. The various objectives required of a suspension system seemingly demand that the suspension system fulfill conflicting functions. For instance, the suspension system is required to provide a softer ride so that occupants do not feel bumps on a roadway while providing stiffness to support the vehicle and keep it stable. Suspension systems in some circumstances must allow for conformity and be less "stiff" to provide a softer ride for occupants while in other circumstances providing rigidity and stiffness to stabilize a vehicle as is required in vehicle turns.

Previous suspension systems and the like have described a variety of systems to make the ride more comfortable for the occupants of a vehicle. One method of creating a smoother ride is to provide a large profile tire which is used to absorb small deflections and help cushion the ride. As the vehicle encounters a bump, the tire compresses and vehicle occupants do not feel the bump. After the bump, the tire returns to its previous configuration. Similarly, shock absorbers have been made to be soft and easily compressible. Springs have been made to be similarly responsive, and bushings have been made of a soft rubber to absorb impacts as well. However, these modifications to achieve a smooth ride result in very poor handling in a turn as well as making the vehicle ride uncomfortable with the shock absorber or damper taking a very long time to control the oscillations from the springs. When a vehicle enters a corner to make a turn, a number of components of the vehicle compress allowing the vehicle to roll. These include the shock absorber, the bushings, and the sidewall of the tire. Compression of these components reduces the ability of the suspension system to alter and change vehicle momentum thus decreasing the ability of a driver of the vehicle to control it.

In order to address vehicle stability problems, previous systems have described various methods of providing increased stability to a vehicle and creating a stiffer suspension. As previously indicated, the need for increased stability is particularly evident when a vehicle is turning or cornering. One means commonly used to stiffen a suspension system is to equip the vehicle with low profile tires to enhance the cornering of the vehicle. Others may use a low profile tire for aesthetic reasons. A low profile tire has less sidewall distance between the roadway and the rim on which it is mounted so that the flexible component of the tire is reduced. For instance, if a high profile tire would compress three inches when cornering or encountering a bump, a low profile tire may only compress one inch. As these small one-inch deflections (approximately) are encountered the air within the tire is compressed and the rubber of the tire responds by compressing in some areas and expanding to some degree in others. The tire then returns to its normal shape in an elastomeric response and the air returns to its previous pressure level.

Although providing increased stability, the force of an impact is usually fully transmitted to the occupants making the ride less comfortable. The stiffer suspension achieved through the use of low profile tires, stiff shocks, and hard bushings, transmits the forces from small deflections in the road directly to the occupants reducing comfort.

Shock absorbers of the prior art are generally constructed either to be less stiff with the ability to absorb roadway deflections and create a smoother more comfortable ride for the occupants or to be more stiff, providing greater stability to the vehicle, but decreased comfort to the occupants of the vehicle. They cannot incorporate the benefits of comfort and stability into a single shock absorber.

If a suspension is equipped with stiffer shock absorbers, the shock absorber relies on the tire wall to absorb small deflections. However, as small roadway deflections are absorbed by the tire, vehicle occupants begin to experience reduced vehicle handling ability. If a suspension is equipped with softer, less stiff, shock absorbers, such shock absorbers have a decreased ability to return the shock to its pre-impact state and a decreased ability to maintain a stable position. Accordingly, the vehicle will experience a bouncing effect as it encounters larger bumps and deflections in the roadway.

The current invention overcomes limitation of the prior art by providing a single shock absorber which is capable of providing the comfort of a less stiff suspension while providing the benefits of increased stability realized through a stiffer suspension. The shock absorber of the current invention offers the ability to absorb small roadway deflections and return the shock to the resting state without compromising the ability of the shock to provide necessary stiffness for vehicle stability.

SUMMARY OF THE INVENTION

The invention provides for an improved shock absorber which is capable of absorbing higher pressures created by larger deflections in the roadway and in a separate mechanism absorbing lower pressures created by smaller deflections in the roadway. The mechanism for absorbing lower pressures and smaller deflections may be turned on or off depending on the desires of the user. In particular, where low profile tires are used, the user may desire a stiffer suspension, and a stiffer shock absorber in a curve. In such case, it may be desirable to turn off the portion of the shock absorber designed to absorb smaller deflections so that the car will not "roll" when going around a curve.

The shock absorber may contain a housing 35 attached to a suspension system of a vehicle at a lower attachment point 20 and attached to a vehicle chassis at an upper attachment point 25. For absorbing higher pressure and greater roadway deflections, the shock absorber may utilize a piston applying force against hydraulic fluid 15 to absorb the force of the impact. As the piston is forced against the hydraulic fluid, the hydraulic fluid may pass through passageways in the piston or the chamber, the art is replete with many designs to dampen. In this manner, some of the hydraulic fluid passes through the piston and not all of force is transmitted in the direction of the roadway deflection. The effect is to dampen the strength of the force. The hydraulic fluid 15 is contained within a traditional shock absorber 17 which houses the piston and hydraulic fluid 15, valving, air pocket and other components of a traditional shock absorber. The piston may then be returned to its original position by means of a spring or other means to return the piston to its original position or resting state.

The shock absorber may also contain A non-compressible fluid or relatively non compressible fluid 30 may be within a first chamber 150 positioned above the traditional shock absorber. An outlet hose 40, may be attached to the housing 35 at one end and connected to a second chamber or reservoir bladder 45. Accordingly, when striking a smaller deflection creating low pressure, the traditional shock absorber (high force compression and dampening unit) moves in the direction of the first chamber. The fluid moves into a second expandable chamber. The effect is to absorb the strength of the impact as the second chamber expands. Instead of the forcing the vehicle chassis upward in the direction of the roadway deflection, the first chamber compresses, and the second chamber expands minimizing or eliminating the upward force.

In a preferred embodiment, the traditional shock absorber or damper with piston and hydraulic fluid has a greater resistance to compression than the second chamber. In this way, the second chamber is able to absorb low pressure from small deflections. If higher pressure is generated a result of a larger deflection, after the second chamber fully expands, the traditional shock absorber and associated components dampen the intensity of the higher pressure created by the greater roadway deflection.

In addition to an elastomeric system where pressure is automatically applied, A pump system or pressure system or spring unit or combination thereof may be used to apply energy to the second chamber to move the fluid back to the first chamber. This applied energy may be regulated and controlled by computer system and various sensors of pressure, vehicle roll, steering angles, turning angles, depending on what characteristics are desired and what existing sensors, cpu, accelerometers, etc may provide the data in the most effective way, cost or otherwise. Valve 55 may be interposed between the first and second chambers As a vehicle proceeds around the curve, the vehicle has a tendency to roll. If the shock absorber is permitted to compress because the elastomeric second chamber or bladder 45 is permitted to expand when the vehicle is in a curve, the effect of a low profile tire is lost. Accordingly, in this circumstance, valve 55 may be closed to prevent fluid 30 from entering the second chamber and prevent the first chamber within the shock absorber system from compressing. In straight driving, valve 55 may be opened to permit absorption of small deflections.

DETAILED DESCRIPTION OF THE INVENTION

Figure 1:
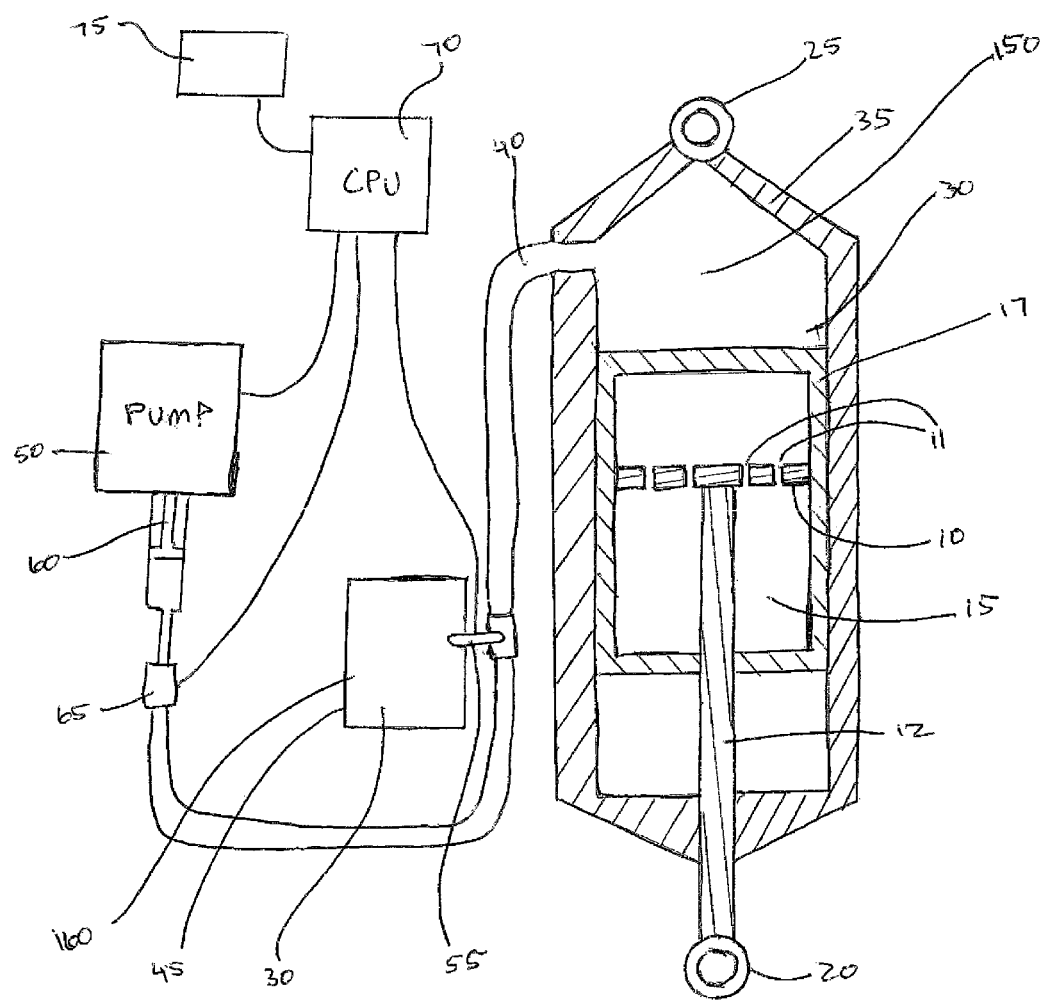
FIG. 1 shows a cross sectional view of the shock absorber containing a pump to maintain pressure within the system according to the invention.

The shock absorber of the current invention contains additional components than those found in traditional shock absorbers which dampen oscillations by permitting the 2 stage shock absorber to absorb small deflections while still maintaining stiffness and stability in vehicle turns. As shown in FIG. 1, as with traditional shock absorbers, the shock absorber may contain a housing 35 with an upper end and a lower end. The lower end may be attached to a suspension system of a vehicle at a lower attachment point 20. The suspension system may include the axle and other elements of the vehicle suspension system. The upper end may be attached to a vehicle chassis or structural element at an upper attachment point 25. The vehicle chassis may include the frame, the body, and other structural elements of the vehicle body.

For discussion purposes shock absorber refers to the traditional dampers well known in the art and two stage shock absorber will refer to the present invention. The shock absorber may contain a hydraulic 15 or similar fluid for providing resistance and "stiffness" when the vehicle encounters a bump in the roadway. As the vehicle encounters a bump in the roadway, the force pushes on main piston rod 12 and main piston 10 against the hydraulic fluid 15. The hydraulic fluid 15 is contained within a shock absorber housing 17 which houses the piston and hydraulic fluid 15 and a gas to allow movement of the piston. The shock absorber 17 is positioned within the housing 35 and may move slideably within the housing. The hydraulic fluid remains under varying degrees of pressure and provides a certain amount of resistance to the force of the impact of the bump and resulting oscillations The piston may contain passageways 11 through or around the piston to permit hydraulic fluid to move from one side of the piston facing the upper end of the housing to the other side of the piston facing the lower end of the housing within the traditional shock absorber when roadway forces apply pressure against the piston. This configuration, involving the piston and hydraulic fluid within an area, may be referenced herein as a traditional shock absorber assembly. In this manner, when the piston is pushed in one direction against the hydraulic fluid, some of the hydraulic fluid may escape to the other side of the piston thus reducing the amount of pressure exerted by the roadway force and damping the effect of the roadway force. The piston may then be returned to its original position by means of the vehicle spring(s) or other means to return the piston to its original position or resting state.

The non-compressible or poorly compressible substance or fluid 30 may be positioned within the housing 35 in a first chamber 150 at an end of the housing opposite the piston rod. Below the traditional shock absorber there is a chamber that contains a compressible substance or fluid or air. As the shock slides up within the housing of the two stage unit, the substance such as air will expand and allow the shock to slide. Depending on the substance it is possible a vacuum or elastic force would be created to pull or help pull the shock back to the starting position in the housing. When a small force is encountered by the vehicle this force would push the shock absorber to slide in the housing collapsing the first chamber but the force would not be great enough to move the piston within the shock. In this manner the shock itself would act as a piston driving the fluid out of the first chamber into the second. If the force was greater than this, both movement of the piston and movement of the shock within the housing (so that the shock acts as a piston) would both occur to the degree necessary. The level of resistance provided by the shock absorber may be varied depending on the need for less stiffness and increased comfort or greater stiffness and increased stability.

An outlet hose 40, may be attached to the housing 35 at one end and connected to a second chamber or reservoir 45. The bladder may also be referenced herein as a second chamber 160. The second chamber may be located anywhere within the vehicle and may be attached exterior to the housing. It also could be integral to the two stage shock. One method to do this would be to add another concentric chamber or chambers to the housing and locate a solenoid valve between. The second chamber may also be positioned within the housing at an end opposite the first chamber.

Figure 4:
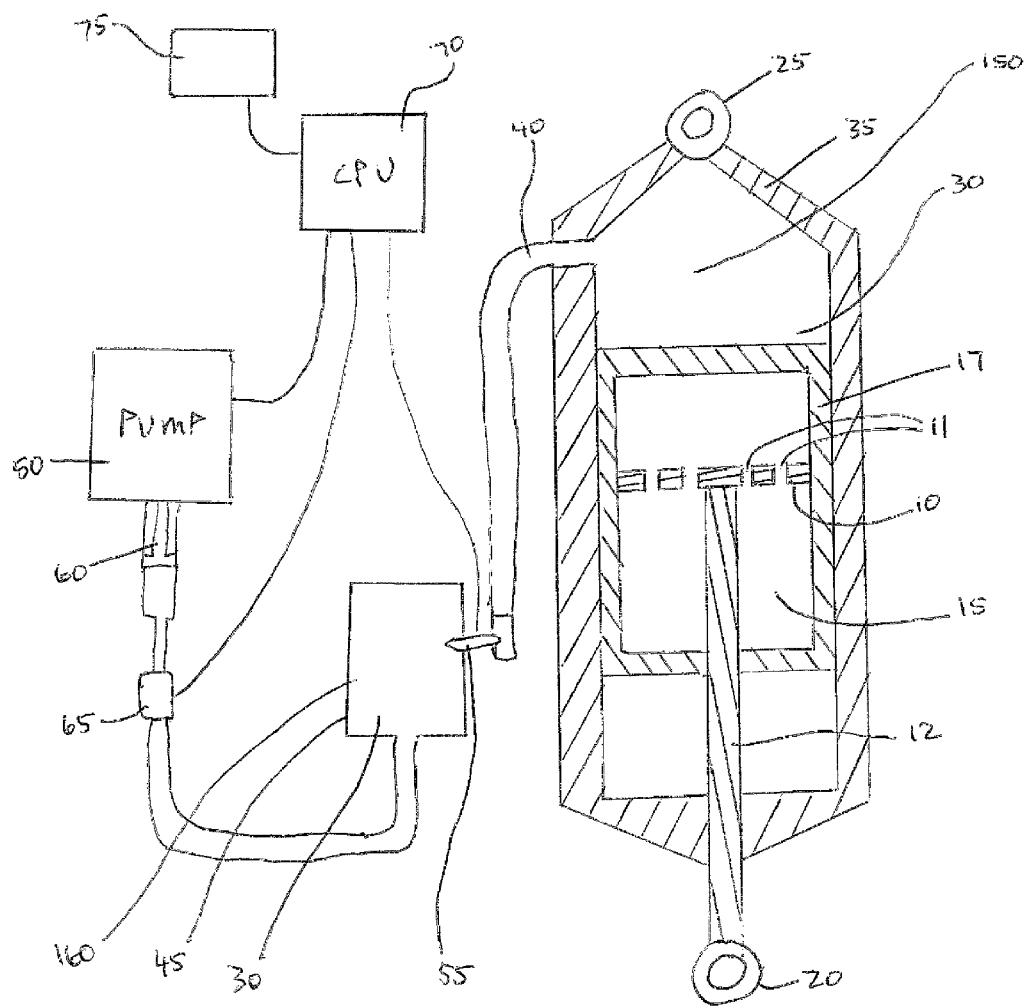
FIG. 4. shows a cross sectional view of the shock absorber containing a Dump connected directly to the second chamber to maintain pressure within the system and force fluid back toward the first chamber according to the invention.

The next function of the invention is to return the fluid transmitted to the second chamber back to the first chamber and return the two stage shock back to its starting position. This would require an input of energy. This can be done with an elastomeric system. It would be chosen such that as the fluid expands it the same amount of force is generated by the elastomeric confinement to return the fluid back to the first chamber, rebalancing the distribution of the fluid. An advantage of this system is that it would occur automatically. As shown in FIG. 4, the reservoir chamber 45 may also be connected to a pump system which applies appropriate force or pressure to the chamber to return the fluid which left the first chamber into the second chamber back to the first chamber. A system of pressure indicators, volume indicators flow sensors etc. integrated with a cpu unit to drive the pump to respond accordingly, the principle being to determine how much fluid has left the first chamber and then return that amount. A secondary spring may also apply force against the second chamber to return fluid to the first chamber. This may be used in combination with the other methods.

In a preferred embodiment, the resistance provided by the hydraulic fluid and piston within the traditional shock absorber 17 is greater than the resistance provided by the expansion of the second chamber 45 and the fluid 30. In this manner, when small roadway deflections exert pressure on the system, the fluid and the second chamber may absorb low pressure created by the deflection even though the deflection may not have exerted enough pressure to compress the piston within the traditional shock absorber. When a larger roadway deflection is encountered, exerting a greater force and higher pressure, the traditional shock absorber may be forced to the top of the housing fully expanding the second chamber. The piston may then begin to move upward within the traditional shock absorber against the hydraulic fluid. As hydraulic fluid passes through the passageways 11, it dampens the effect of the greater force and higher pressure. In this manner, smaller deflections may be absorbed by the fluid 30 and second chamber 45 under low pressure conditions while higher pressure resulting from greater deflections may be absorbed by the piston and hydraulic fluid within the traditional shock absorber.

However, low profile tires provide increased stability when encountering a curve in the roadway. As the vehicle proceeds around the curve, the vehicle has a tendency to roll, and the low profile tire counters this affect by resisting compression. If the shock absorber is permitted to compress because the second chamber 45 is permitted to expand when the vehicle is in a curve, the effect of the low profile tire is lost. Accordingly, in this circumstance, valve 55 may be closed to prevent fluid 30 from entering the second chamber and prevent the first chamber in the two stage shock absorber system from compressing. In straight driving, valve 55 may be opened to permit absorption of small deflections. The valve may be opened and closed manually, from a control within the vehicle, from inputs sensed by accelerometers, or means of anticipating tilt such as sensors on the steering wheel or from wheels as described in the Smith U.S. Pat. No. 5,979,616 patent, or by means of a CPU as is discussed further below. In this manner, the vehicle maintains desired stiffness around a curve but gains an advantage to absorb small deflections in straight driving.

In addition to the resistance provided by the traditional shock absorber system in conjunction with first and second chamber assembly, any of the previously described roll control systems could also be incorporated into the standard shock within the two stage shock.

In straight line driving, where less stability is required, the CPU may direct the valve 55 to remain open to permit the fluid to enter the second chamber 45. As the vehicle encounters bumps and small deflections, the force created by the bumps may be transmitted through the valve into the second chamber where the fluid and second chamber absorb the force of the impact. In this situation, the second chamber performs a function similar to a high profile tire where force is absorbed through compression and is not transmitted to the vehicle occupants thus creating a smoother ride.

When the vehicle enters a turn, greater vehicle stability may be required. The tilt sensor 75 may sense that the vehicle tilt in response to the curve and transmit data to the CPU 70 which may then direct the pump 50 to increase pressure in the system and close the valve 55 preventing fluid or the compressible substance from entering the bladder 45. Increased pressure prevents the main piston 10 from moving in the direction of the force created as the vehicle enters the turn. Accordingly, the vehicle chassis is prevented from tilting or rolling by preventing movement of the vehicle chassis toward the lower suspension system thus providing greater stability to the vehicle throughout the turn. The tilt sensor provides data to the CPU as the vehicle exits the turn and the CPU may direct the valve to open thereby permitting the bladder assembly to again receive compressible fluid for a more comfortable ride to the vehicle occupants.

The advantages of the invention over the prior art are readily apparent. The shock absorber of the invention permits the use of low profile tires to maintain stability of the vehicle in a turn but yet maintain comfort when the vehicle encounters bumps and deflections in straight line driving. The shock absorber of the invention further permits the use of sensors to detect tilt or roll or lateral acceleration of the vehicle. This would disallow the absorption of the one inch deflection while the vehicle is in a turn, giving full advantage of the low profile tire in the turn. The shock absorber of the invention also allows the use of harder and smaller bushings in the suspension system since the second chamber 45 would compress and absorb some of force of bumps, except in a turn.

The shock absorber of the invention combines the support capabilities of a traditional shock absorber with the compression capabilities of a traditional high profile tire, and enables the advantages of comfort associated with reduced stiffness to be combined with the advantage of stability associated with increased stiffness in one device. Accordingly, low profile tires and smaller bushings may be utilized to increase stability without sacrificing comfort to vehicle occupants. The shock absorber of the invention permits absorption of small rapid deflections and while actively returning the system to its original position. This subject invention provides three characteristics previously not previously achieved in one system: (1) absorption of shock in a traditional manner, i.e. the ride can be very smooth over irregular surfaces, and (2) excellent cornering by using a low profile tire avoiding tire wall compression which increases vehicle roll or tilt.

Figure 2:
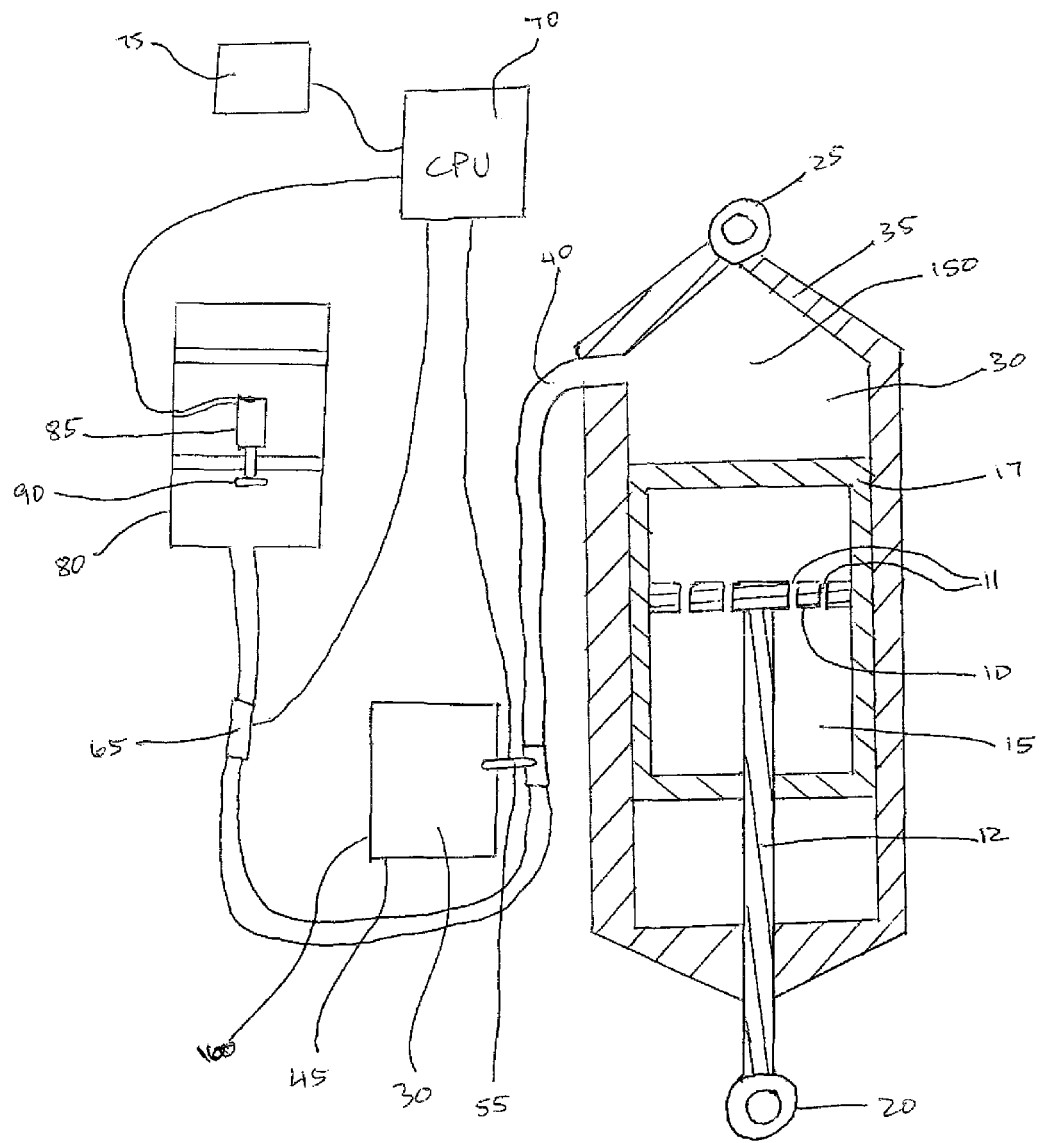
FIG. 2 shows a cross sectional view of the shock absorber containing a tilt control unit within the system according to the invention.

The system of the subject invention may also be combined with the tilt control apparatus described by Smith in U.S. Pat. No. 5,971,115. In that system, a tilt control mechanism is hydraulically connected to a shock absorber system. During normal vehicle operation, fluid is permitted to flow between these two units. However, when the vehicle tilts during turning, a tilt sensor signals a valve in the tilt control mechanism to close to prevent the flow of fluid or almost all flow from the shock absorber thus preventing the shock absorber from further compressing and preventing further movement of the body toward the axle As shown in FIG. 2, in a combined system, a tilt control unit 80, as is more fully described in U.S. Pat. No. 5,971,115, may be used in place of the pump 50. The fluid 30 may be used as a medium to transfer the pressure created by the tilt control unit back to the shock absorber. When the vehicle enters a turn, the tilt sensor 75 may sense vehicle tilt and transmit data to the CPU 70. The CPU may then direct a solenoid 85 within the tilt sensor to close a solenoid valve 90 thus preventing the flow of fluid from the shock absorber housing 35. At the time same, the CPU directs valve 55 to close preventing the flow of fluid into the bladder. This in turn prevents the main piston 10 from moving upward and maintains the position of the vehicle chassis relative to the lower suspension thus reducing vehicle tilt or roll.

Rather than being a separate unit, the second chamber 45 may be incorporated into the body of the shock absorber housing 35 in a variety of ways. The bladder may be placed in any location that fulfills the function expressed above. Furthermore the system may be controlled by the driver as to its function. If the driver desired to feel bumps in the road for a particular application, he or she may be able to turn off the function of the bladder or second chamber so that the system provided increased stability, i.e. a stiffer suspension with a low profile tire effect, all the time. This effect may be achieved by wiring an off/on switch to the vehicle driver or alternatively to a voice command mechanism connected to the CPU 70.

Figure 3:
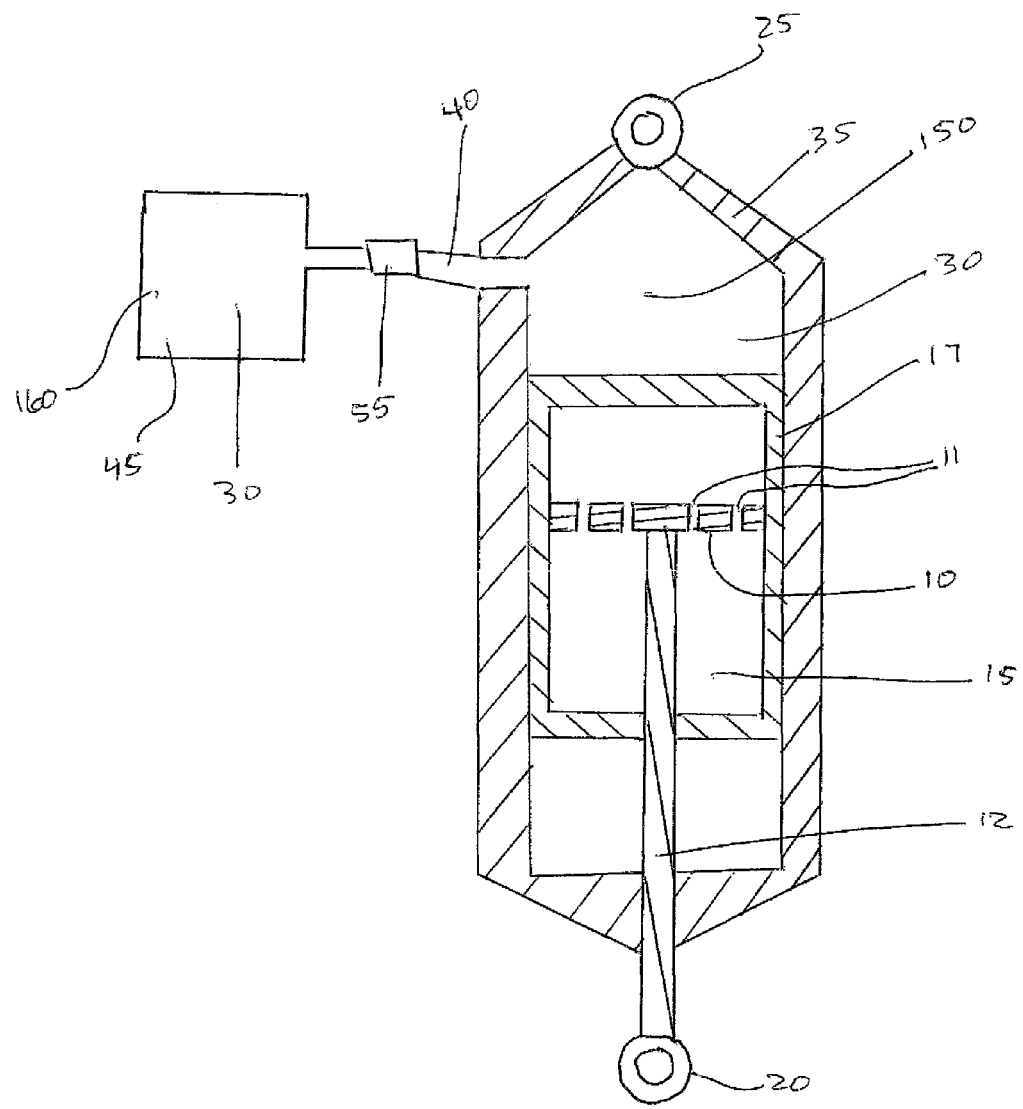
FIG. 3 shows a cross sectional view of the shock absorber with first chamber and second chamber according to the invention.

As shown in FIG. 3, the traditional shock absorber assembly, involving the piston and hydraulic fluid within an area, may be used in conjunction with the first chamber and bladder (second chamber). The fluid may be positioned in the first chamber above the traditional shock absorber and when force is exerted against the piston creating upward pressure against the hydraulic fluid and the entire traditional shock absorber, the traditional shock absorber moves upward to compress the first chamber and force the fluid or substance into the second chamber or bladder. The bladder may also expand to absorb the pressure created by the roadway deflection. Valve 55 may be interposed between the first chamber and the bladder (second chamber) to prevent the flow of fluid from the first chamber to the bladder when the vehicle is subject to tilt by going around a curve. The valve may be controlled manually by the driver to regulate when to turn on or off the ability to absorb low pressure impacts. In this manner, the stability offered by the low profile tire may be maintained. In this simpler embodiment, pumps, tilt control mechanisms, or a CPU are not required for operation of the improved shock absorber system.

The invention has been disclosed in terms of preferred embodiments which fulfill all of the objects of the present invention and overcome the limitations of the prior art. Various changes, modifications, and alterations from the teachings of the present invention may be contemplated by those skilled in the art without departing from the intended spirit and scope thereof. It is intended that the present invention only be limited by the terms of the appended claims.

I claim:

1. A method of dual force shock absorption to absorb low compressive forces while still providing damping in a vehicle containing body, at least one wheel, axle, spring, and tire comprising the steps of:
   transferring the force to a traditional shock absorber having a housing, and the traditional shock absorber contained within a second housing
   compressing a first chamber filled with fluid, the first chamber being within the second housing but outside the traditional shock absorber, by sliding the traditional shock absorber within the second housing
   transferring the fluid from the first chamber to an expandable second chamber
   after the first chamber has substantially compressed, then compressing the traditional shock absorber by moving a piston within the housing of the traditional shock absorber
   returning the piston of the traditional shock absorber to its initial position through forces generated by the springs
   returning the fluid from the second chamber to the first chamber by applying force to the second chamber.

* * * * *